(12) United States Patent
Kim et al.

(10) Patent No.: US 11,290,562 B2
(45) Date of Patent: Mar. 29, 2022

(54) RESOURCE MANAGEMENT METHOD AND DEVICE

(71) Applicants: HYUNDAI MOTOR COMPANY, Seoul (KR); KIA MOTORS CORPORATION, Seoul (KR)

(72) Inventors: Joon Young Kim, Hwaseong-si (KR); Young Jin Na, Hwaseong-si (KR); Min Byeong Lee, Hwaseong-si (KR); Jae Seung Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/257,754

(22) PCT Filed: Jul. 5, 2019

(86) PCT No.: PCT/KR2019/008298
§ 371 (c)(1),
(2) Date: Jan. 4, 2021

(87) PCT Pub. No.: WO2020/009537
PCT Pub. Date: Jan. 9, 2020

(65) Prior Publication Data
US 2021/0281657 A1    Sep. 9, 2021

Related U.S. Application Data

(60) Provisional application No. 62/694,523, filed on Jul. 6, 2018.

(51) Int. Cl.
*G06F 15/16* (2006.01)
*H04L 67/59* (2022.01)
(Continued)

(52) U.S. Cl.
CPC ......... *H04L 67/2861* (2013.01); *H04L 47/82* (2013.01); *H04L 63/10* (2013.01); *H04L 63/20* (2013.01); *H04L 67/16* (2013.01)

(58) Field of Classification Search
CPC ..... H04L 67/2861; H04L 67/16; H04L 63/10; H04L 63/20; H04L 47/82
(Continued)

(56) References Cited

U.S. PATENT DOCUMENTS 8,214,506 B2 *   7/2012   Ragunathan .......... H04L 65/605
                                                                   709/227
9,642,031 B2 *   5/2017   Han .................. H04W 28/0289
(Continued)

FOREIGN PATENT DOCUMENTS

JP    2002-245018 A    8/2002
JP    2008-542871 A    11/2008
(Continued)

OTHER PUBLICATIONS

International Search Report and Written Opinion for Int. App. No. PCT/KR2019/008298, dated Oct. 30, 2019.

*Primary Examiner* — Moustafa M Meky
(74) *Attorney, Agent, or Firm* — McDonnell Boehnen Hulbert & Berghoff LLP

(57) ABSTRACT

The present invention relates to a method of performing group management in a machine-to-machine (M2M) system. Herein, the group management method may include controlling a group member included in a group based on a group resource.

20 Claims, 17 Drawing Sheets

(51) Int. Cl.
  *H04L 47/70*   (2022.01)
  *H04L 29/06*   (2006.01)
  *H04L 67/51*   (2022.01)

(58) Field of Classification Search
  USPC ........................................................ 709/226
  See application file for complete search history.

(56) References Cited

U.S. PATENT DOCUMENTS

| | | | |
|---|---|---|---|
| 10,104,085 B2* | 10/2018 | Horii | H04L 67/32 |
| 10,148,573 B2* | 12/2018 | Zhang | H04L 12/10 |
| 10,305,909 B2* | 5/2019 | Horii | H04L 67/2814 |
| 10,924,965 B2* | 2/2021 | Chai | H04B 17/309 |
| 11,039,349 B2* | 6/2021 | Xu | H04W 76/15 |
| 2016/0095129 A1* | 3/2016 | Hoyhtya | H04W 72/0446 |
| | | | 370/330 |
| 2017/0163644 A1* | 6/2017 | Horii | H04L 63/10 |
| 2018/0159745 A1 | 6/2018 | Byers et al. | |
| 2018/0351953 A1* | 12/2018 | Horii | H04L 63/10 |
| 2020/0036808 A1* | 1/2020 | Yu | H04L 67/2861 |
| 2020/0389823 A1* | 12/2020 | Xu | H04W 36/0061 |

FOREIGN PATENT DOCUMENTS

| | | |
|---|---|---|
| KR | 2012-0076123 A | 7/2012 |
| KR | 2016-0138507 A | 12/2016 |

* cited by examiner

RESOURCE MANAGEMENT METHOD AND DEVICE

CROSS REFERENCE TO RELATED APPLICATIONS

The present application is a U.S. National Phase application pursuant to 35 U.S.C. § 371 of International Application No. PCT/KR2019/008298 filed Jul. 5, 2019, which claims priority to a U.S. provisional application 62/694,523 filed Jul. 6, 2018. The entire disclosure contents of these applications are herewith incorporated by reference into the present application.

BACKGROUND

Field of the Invention

The present disclosure relates to a method and apparatus for resource management. Also, the present disclosure relates to a method and apparatus for resource offloading.

Description of the Related Art

Recently, introduction of Machine-to-Machine (M2M) system has become active. M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering.

Meanwhile, with respect to an M2M terminal, the one M2M standardization organization provides requirements for M2M communication, things to things communication and IoT technology, and technologies for architecture, Application Program Interface (API) specifications, security solutions and interoperability. The specifications of the one M2M standardization organization provide a framework to support a variety of applications and services such as smart cities, smart grids, connected cars, home automation, security and health.

SUMMARY

The present invention may provide a method and apparatus for resource management.

The present invention may provide a method and apparatus for resource offloading.

The present invention may provide a method and apparatus for managing a resource in an M2M system.

The present invention may provide a method and apparatus for performing resource offloading in an M2M system.

The present invention may provide a management policy for resource offloading.

The present invention may provide a method and apparatus satisfying requirements for low delay and high reliability through resource offloading.

According to an embodiment of the present invention, a method for performing resource offloading in an apparatus may be provided. Herein, the method for performing resource offloading may include transmitting, by the apparatus, a request message that indicates offloading for a target resource and receiving, by the apparatus, a service through the target resource that is offloaded to a first node based on the request message. Herein, the request message includes information on the target resource that is offloaded, and the target resource may be offloaded from a second node to the first node based on the request message.

Also, according to an embodiment of the present invention, an apparatus may be provided. Herein, the apparatus may include at least one processor and at least one memory that is coupled to the at least one processor. Herein, the at least one processor, which is coupled to the at least one memory to be capable of executing program instructions stored in the at least one memory, transmits a request message indicating offloading for a target resource and receives a service through the target resource that is offloaded to a first node based on the request message. The request message includes information on the target resource that is offloaded, and the target resource may be offloaded from a second node to the first node based on the request message.

Also, for a method and apparatus for performing offloading, the following points may be commonly applied.

According to an embodiment of the present invention, the second node may include an original resource for the target resource, and the first node may include an offloaded resource for the target resource.

Also, according to an embodiment of the present invention, the offloaded resource included in the first node may be managed based on a management policy.

Also, according to an embodiment of the present invention, the management policy includes a blocking policy, and when the offloaded resource included in the first node is managed based on the blocking policy, the access to the offloaded resource included in the first node may be blocked.

Also, according to an embodiment of the present invention, when the access to the offloaded resource included in the first node is blocked, operation related to the original resource included in the second node may be limited.

Also, according to an embodiment of the present invention, the management policy includes a readable policy, and when the offloaded resource included in the first node is managed based on the readable policy, only retrieve operation may be allowed among operations related to the original resource included in the second node.

Also, according to an embodiment of the present invention, the first node and the second node implement synchronization for the target resource, and the request message indicating the offloading may include information on a synchronization mode (synchmode) for the implemented synchronization. Herein, the synchronization mode may include at least any one of a periodic mode, an update mode, and a termination mode.

Also, according to an embodiment of the present invention, when the synchronization mode is the periodic mode, the first node and the second node may periodically perform the synchronization for the target resource.

Also, according to an embodiment of the present invention, when the synchronization mode is the update mode, the first node and the second node may perform the synchronization for the target resource once an update is performed for the offloaded resource included in the first node.

Also, according to an embodiment of the present invention, when the synchronization mode is the termination mode, the first node and the second node may perform the synchronization for the target resource once the offloading for the target resource terminates.

Also, according to an embodiment of the present invention, the first node may be a middle node-common service entity (MN-CSE), and the second node may be an infrastructure node-common service entity (IN-CSE).

Also, according to an embodiment of the present invention, a method for performing resource offloading in a first node may be provided. Herein, the method for performing resource offloading may include receiving, by the first node, a request message indicating offloading for a target resource from a second node and offloading, by the first node, the target resource to a third node based on the request message. Herein, the second node receives, from the third node, a service based on the target resource of the first node that is offloaded to the third node, and the request message may include information on the offloaded target resource.

Also, according to an embodiment of the present invention, the first node may include an original resource for the target resource, and the second node may include an offloaded resource for the target resource.

Also, according to an embodiment of the present invention, the first node may be an infrastructure node-common service entity (IN-CSE), the second node may be an application entity (AE), and the third node may be a middle node-common service entity (MN-CSE).

Also, according to an embodiment of the present invention, a method for performing resource offloading in a first node may be provided. Herein, the method for performing resource offloading may include receiving, by the first node, offloading for a target resource from a second node and providing, by the first node, a service for the target resource to a third node based on the offloaded target resource.

Also, according to an embodiment of the present invention, the first node receives a request message indicating offloading for the target resource from the third node and is provided, based on the request message, with offloading for the target resource from the second node. The request message may include information on the target resource that is offloaded.

Also, according to an embodiment of the present invention, the second node receives a request message indicating offloading for the target resource from the third node, and the first node is provided, based on the request message, with offloading for the target resource from the second node. The request message may include information on the target resource that is offloaded.

Also, according to an embodiment of the present invention, the first node may include an offloaded resource for the target resource, and the second node may include an original resource for the target resource.

Also, according to an embodiment of the present invention, the first node may be a middle node-common service entity (MN-CSE), the second node may be an infrastructure node-common service entity (IN-CSE), and the third node may be an application entity (AE).

According to the present disclosure, a method and apparatus for resource management may be provided.

According to the present disclosure, a method and apparatus for resource offloading may be provided.

According to the present disclosure, a method and apparatus for managing a resource in an M2M system may be provided.

According to the present disclosure, a method and apparatus for performing resource offloading in an M2M system may be provided.

According to the present disclosure, a management policy for resource offloading may be provided.

According to the present disclosure, a method and apparatus satisfying requirements for low delay and high reliability through resource offloading may be provided.

Effects obtained in the present disclosure are not limited to the above-mentioned effect, and other effects not mentioned above may be clearly understood by those skilled in the art from the following description.

DETAILED DESCRIPTION

Figure 1:
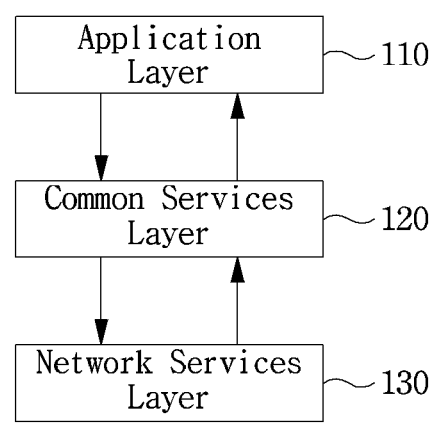
FIG. 1 is a view illustrating a layered structure of a Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In addition, the present specification describes a network based on Machine-to-Machine (M2M) communication, and a work in M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station.

In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present invention mainly describes an M2M system but is not solely applied thereto.

In addition, an M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

FIG. 1 is a view illustrating a layered structure of an M2M system.

Referring to FIG. 1, a layered structure of an M2M system may consist of an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE).

The network services layer 130 may provide the common services layer 120 with services such as device management, location service and device triggering. Herein, an entity operating based on the network services layer 130 may be a network service entity (NSE).

Figure 2:
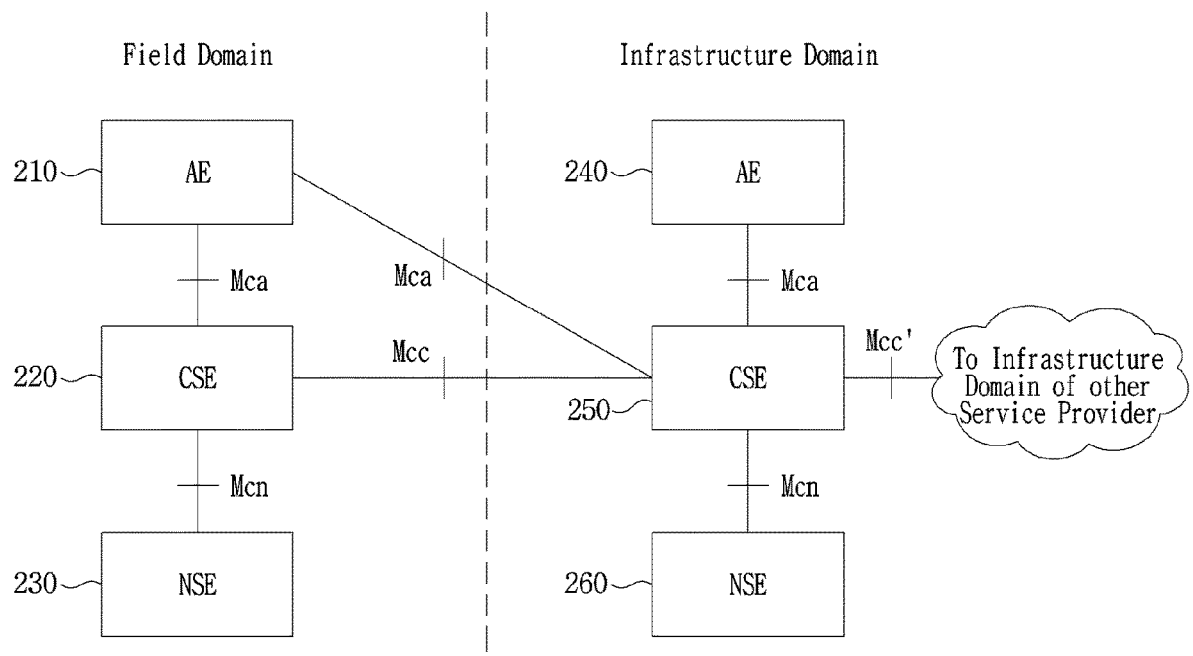
FIG. 2 is a view illustrating reference points in an M2M system according to the present disclosure.

FIG. 2 is a view illustrating an M2M system structure.

Referring to FIG. 2, an M2M system structure may be distinguished into a field domain and an infrastructure domain. Herein, in each domain, each of the entities may perform communication through a reference point. For example, a reference point may indicate a communication flow between each entity. Herein, referring to FIG. 2, the reference point Mca between AE and CSE, the reference point Mcc between different CSEs and the Mcn reference point between CSE and NSE may be set.

Figure 3:
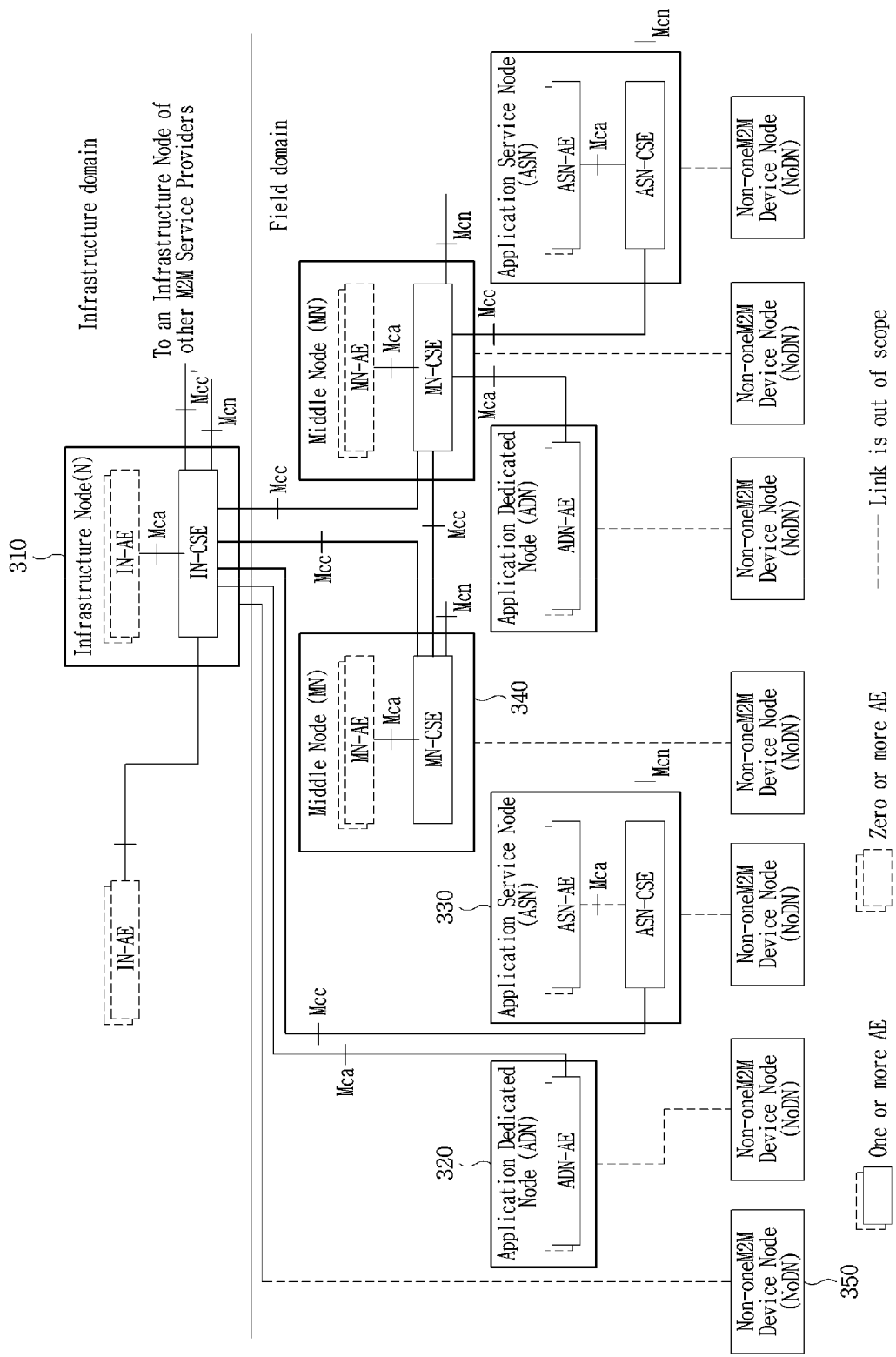
FIG. 3 is a view illustrating each node according to the present disclosure.

FIG. 3 is a view illustrating the setting of an M2M system structure.

Referring to FIG. 3, an infrastructure domain of a specific M2M service provider may provide a specific infrastructure node (IN) 310. Herein, the CSE of the IN may perform communication based on the AE and the reference point Mca of another infrastructure node. In this case, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Herein, an ADN may be set in the field domain. In other words, an ADN may be a dedicated node for AE. For example, an ADN may be a node that is set in an M2M terminal in hardware. In addition, an application service node (ASN) 330 may be a node including one CSE and at least one AE. ASN may be set in the field domain. In other words, it may be a node including AE and CSE. Herein, an ASN may be a node connected to an IN. For example, an ASN may be a node that is set in an M2M terminal in hardware.

In addition, a middle node (MN) 340 may be a node including a CSE and including zero or more AEs Herein, the MN may be set in the field domain. An MN may be connected to another MN or IN based on a reference point. In addition, for example, an MN may be set in an M2M gateway in hardware.

In addition, as an example, a non-M2M terminal node 350 (Non-M2M device node, NoDN) is a node that does not include M2M entities. It may be a node that performs management or collaboration together with an M2M system.

Figure 4:
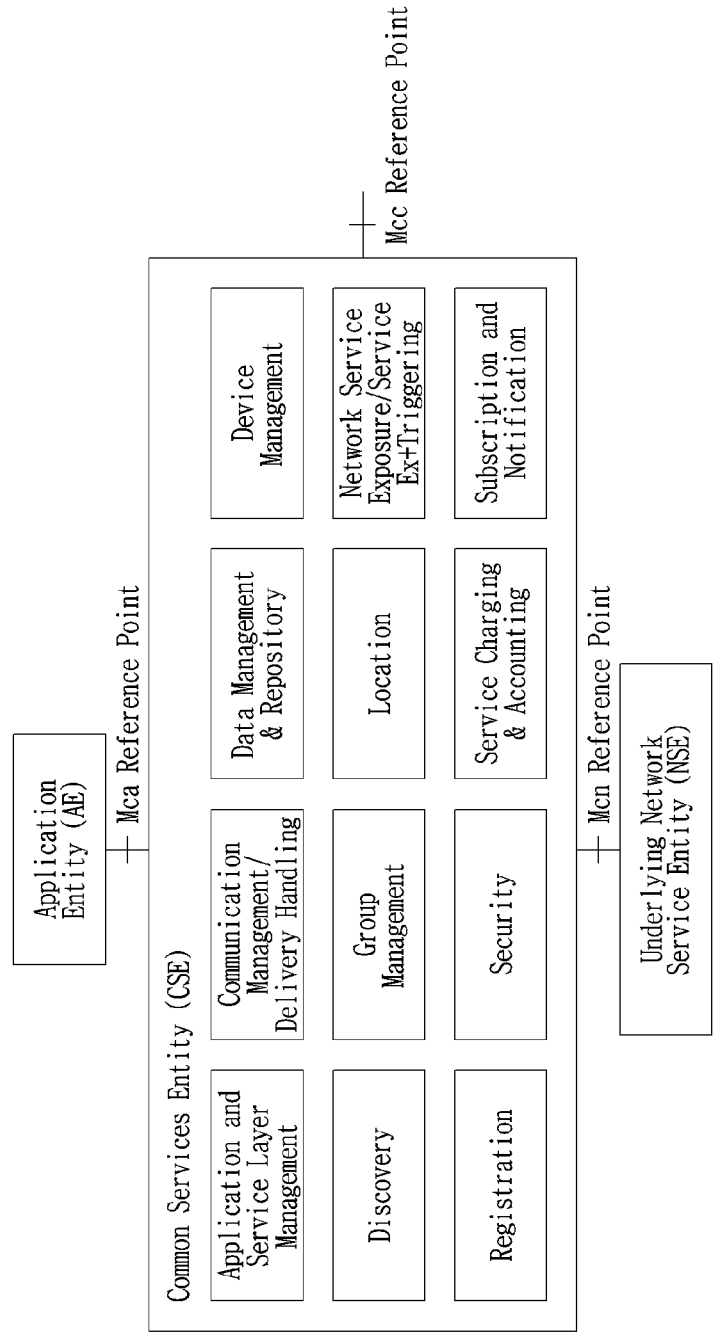
FIG. 4 is a view illustrating a common service function according to the present disclosure.

FIG. 4 is a view illustrating a common service function.

Referring to FIG. 4, common service functions may be provided. For example, a common service function may provide at least any one function among application and service layer management, communication management and delivery handling, data management and repository, device management, discovery, group management, location, network service exposure/service execution and triggering, registration, security, service charging and accounting, service session management, and subscription/notification. Herein, M2M terminals may operate based on a common service function. In addition, a common service function may be possible in other exemplary embodiments and is not limited to the above-described exemplary embodiment.

In addition, for example, at least any one of an M2M platform, an M2M gateway, an M2M device and an application entity (AE) may be included in an M2M system. For example, an IN may serve as an M2M platform, an MN may serve as an M2M gateway. In addition, an ASN or ADN may be an M2M device and may operate based on the above description. In addition, for example, a CSE is used as a common functional element of an M2M system and may perform a common function, as described above. Herein, in order to implement the function, the CSE may be included in an ASN that is used as an M2M platform, an M2M gateway and an M2M device, as described above. In addition, for example, an AE may be included in any one of an M2M platform, an M2M gateway, an ASN, and an AND. In addition, for example, an AE may be used alone and is not limited to the embodiment described above.

Herein, for example, a hosting common service entity (H-CSE) may be an entity that holds a resource or attribute, and a registrar common service entity (R-CSE) is may be a CSE with a terminal (or M2M terminal) registered therein. Herein, for example, the terminal may be at least one of ADN, ASN and MN. In addition, for example, R-CSE and H-CSE may be at least one or more among ASN, MN and IN.

For example, a terminal may acquire a resource from a H-CSE through a R-CSE. Meanwhile, a resource may be expressed based on an object operated in an M2M system. For example, a resource may be defined based on terminal operation information for a specific service and may be indicated based on create/retrieve/update/delete (CRUD). For a more specific example, a terminal (or AE) may obtain attribute information of a resource and a target resource from a H-CSE through a R-CSE. Herein, as described above, the H-CSE may provide the AE with the resource and the attribute information thereof for a specific service. For example, an H-CSE may be a resource server for a special service. For example, a resource server may be a vehicle driving server or a vehicle management server. In other words, a terminal may obtain information for a specific service from a server based on a resource and operate based on the information. Meanwhile, for example, a CSE in an M2M system may include a transceiver, a processor, and a memory. Based on this, the CSE may transmit and receive a data packet to and from other nodes to process the data packet. An apparatus configuration will be described later.

In addition, for example, a resource may store related information through a container and may share data with another entity. Herein, the content instance (contentInstance) may be a child resource. In addition, for example, the attribute information of each resource may be a specific description of the resource. Herein, the resource attribute information may store attribute data of the resource.

Based on the above, a terminal (AE) may obtain a specific resource from an H-CSE through a R-CSE. Herein, the resource may include attribute information as target attribute information. A terminal may perform an operation for a specific service based on the obtained resource and attribute information.

Figure 5:
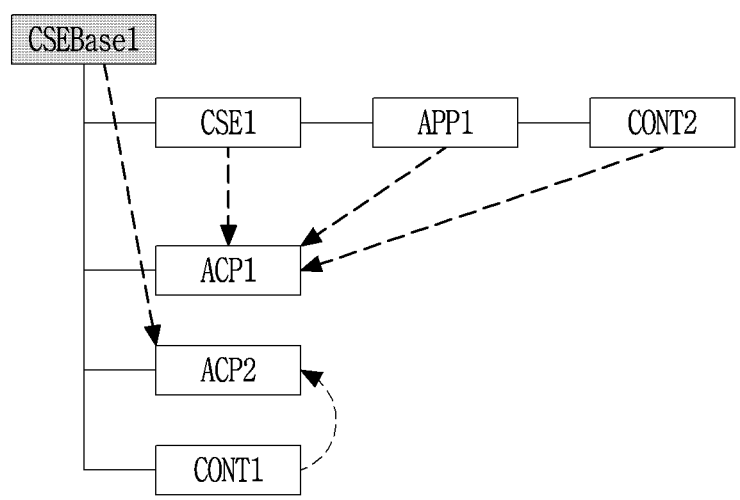
FIG. 5 is a view illustrating a resource structure in CSE according to the present disclosure.

In addition, for example, FIG. 5 is a view illustrating a resource structure in CSE. Referring to FIG. 5, the "CSEBase" resource type may be defined in CSE. For example, "CSEBase" may be a tree-structured resource and be a root resource in CSE. Herein, "CSEBase" may include all the other resources. Also, as an example, "CSE1" in FIG. 5 may be a name of the "remoteCSE" resource type. Herein, the "remoteCSE" resource is a resource existing under "CSEBase" and may include other CSE information registered in the corresponding CSE. In addition, as an example, "APP1" in FIG. 5 may be a name of the AE resource type. Also, as an example, an original resource of a CSE may be announced to "remoteCSE", which will be described later. Herein, the AE resource type may be a resource existing under the "CaseBase" or "RemoteCSE" resource. Herein, as an example, when an AE resource exists under "CSEBsae", information on an application registered (or connected) to the corresponding CSE may be stored. In addition, as an example, when the AE resource exists under "remoteCSE", it may be an AE existing under another CSE (e.g. CSE 1). In addition, as an example, the "container" resource may be a resource that stores data for each CSE or AE. Herein, as an example, "CONT2" may be a resource that stores data for the application of "APP1". Also, as an example, "CONT1" may be a resource that stores data for the corresponding CSE.

In this case, as an example, "ACP1" and "ACP2" may be names of "accessControlPolicy" resources, respectively. Herein, "accessControlPolicy" may be a resource that stores information related to access authority to a specific resource.

In this case, as an example, "ACP1" may include access authority information for CSE1 and AE registered in CSE1 as another CSE. Herein, authentication for another CSE may be performed through "ACP1". In addition, "ACP2" may include access authority information for the CSE, and authentication for the CSE may be performed. That is, a resource as described above may be included in the corresponding CSE, and attribute information on this may be defined. Herein, as an example, based on the above, a resource for R-CSE and a resource for a terminal (or AE) registered in R-CSE as "remoteCSE" may be generated and information may be stored in H-CSE.

In this case, as an example, when operating in the M2M system based on what is described above, a large number of resources and/or tasks may be registered (or connected) to the server (or H-CSE). More specifically, when resources for each CSE (e.g. MN node) and each AE (e.g. terminal) are registered in a server, a load on the server may increase, and thus a smooth operation may be impossible. Based on the above, resource offloading may be required to reduce overhead for a server resource and/or task. In this case, as an example, for what is described above, a terminal (e.g. End IoT device, Edge/Fog) at the bottom needs to support a registered server in real time. As another example, a terminal at the bottom needs to be synchronized with a server and may operate based on this. In the following description, a terminal at the bottom supports a server in real time, as described above, and is capable of being synchronized with the server. However, the present disclosure is not limited thereto. In addition, as an example, the following description may be applied to at least one or more of Vehicle to Everything (V2X), Industrial IoT (IIoT), and Smart Factory, but is not limited thereto.

Figure 6:
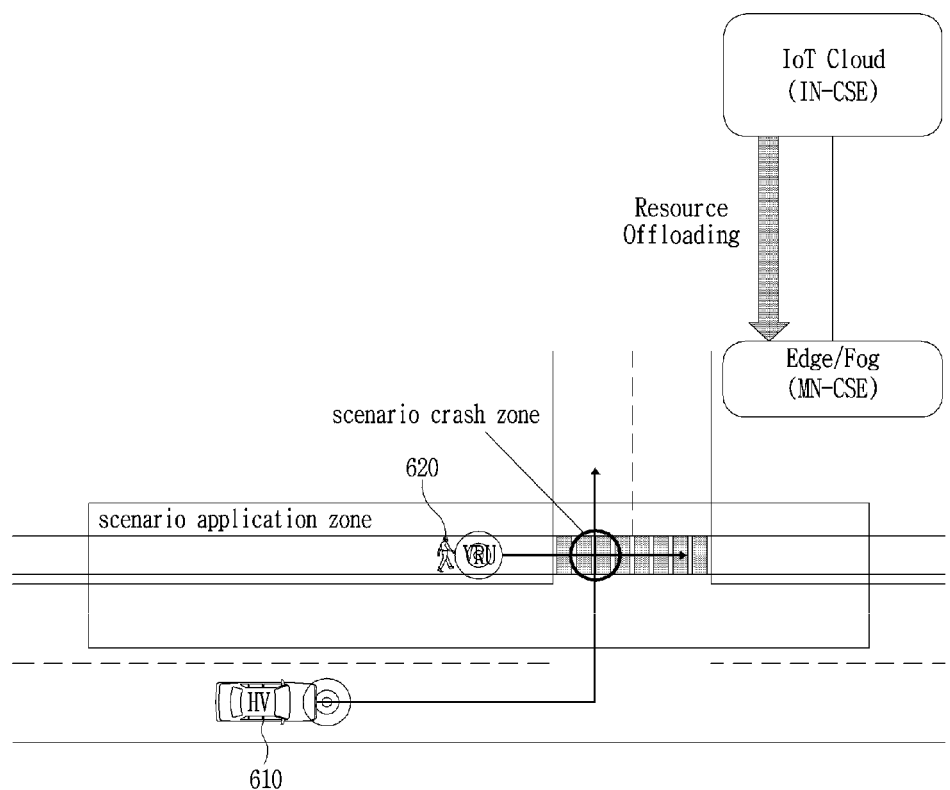
FIG. 6 is a view illustrating a use case requiring resource offloading according to the present disclosure.

FIG. 6 is a view illustrating a case in which resource offloading is applied. Referring to FIG. 6, a possibility of collision between a vehicle (Host Vehicle: HV) 610 and a user (Vulnerable Road User: VRU) 620 may exist in a predetermined area. In this case, as an example, the predetermined area may be an area covered by an MN node. In addition, as an example, the predetermined area may be set differently, and is not limited to the above-described embodiment. As an example, it is possible to consider a case in which the vehicle 610 enters an area covered by an MN node. As described above, the vehicle 610 and the user 620 may have a collision risk within an area covered by an MN node. Herein, when the vehicle 610 is registered in a server and operates based on a resource registered in the server, a delay in resource processing may occur due to a plurality of CSEs and AEs registered in the server. However, since the collision between the vehicle 610 and the user 620 in a certain area may occur in real time, there may be a high requirement for low latency for preventing collision. Accordingly, when the vehicle 610 operates based on a resource registered in a server, the low-latency requirement described above may not be satisfied.

In consideration of the above, for example, when a vehicle (or a moving object) enters an area covered by the above-described MN node, an offloading resource procedure may be performed. Thus, the MN node may obtain a resource for the vehicle, thereby satisfying the low latency requirement. That is, instead of processing the resource by a server as in a central control method, when processing the resource through an MN node in edge/fog computing, overhead for resource processing may be reduced and the low-latency requirement may be satisfied. Herein, as an example, the vehicle 610 or the user 620 may transmit offloading triggering to the MN node. Next, the MN node may offload a resource. Herein, the resource offloading may refer to implementing at least one of resource selection and resource retrieval, which will be described later.

In this case, the above-described MN node may store its own resources and the offloaded resource. For example, the MN node may be a node that has sufficient performance to offload a resource as described above. That is, the data processing performance of the MN node as edge/fog computing may be sufficient to process an offloaded resource, and is not limited to the above-described embodiment. Herein, as an example, when the resource is offloaded to the MN node, the vehicle 610 or the user 620 may operate based on the resource that is offloaded to the MN node and thus may avoid collision. Meanwhile, as an example, the vehicle 610 or the user 620 may include an application, and offloading may be triggered based on an application, as described above. This will be described later.

For a more specific example, referring to FIG. 6, a cloud IoT (Cloud IoT) server needs to delegate a resource and a task to an edge/fog node. Herein, a VRU detection service may be a service for detecting pedestrians or cyclists in a vehicle domain. Herein, a VRU application may provide accurate location information according to various traffic conditions. Herein, as an example, information on the VRU detection service may be shared between VRUs. In addition, VRUs may know location information (or current location information) through a smartphone or other device. In addition, as an example, HVs may also detect the VRUs through the above-described information, thereby avoiding collision. As an example, referring to FIG. 6, when a driver of HV wants to turn left, a pedestrian or a cyclist may pass a place to which the HV is about to move. In this case, as an example, the HV may send an alarm or a warning sound based on the above-described VRU detection service.

Herein, as an example, when the HV is registered in the above-described offloading service, while the HV enters an application zone (or the certain area described above) covered by an MN node (or MN-CSE, Edge/Fog), the above-described offloading procedure may be implemented. Thus, a resource and/or a task related to the HV may be offloaded from a server to the MN node. Herein, as an example, the server may provide indication for resource offloading to the MN node. An MN node may retrieve a relevant resource and/or task from a corresponding resource tree. For example, when an MN node is a node that is closest to a HV, the MN node may transmit a warning message as soon as sensing a VRU.

In addition, as an example, FIG. 6 is only one example, and offloading may be triggered in consideration of another situation or case and is not limited to the above-described embodiment. That is, resource offloading may deliver a relevant resource and/or task from a server (or IN-CSE) to a target edge/fog (MN-CSE). Next, an MN node may directly provide an offloading service to a lower terminal, which will be described later.

Figure 7A:
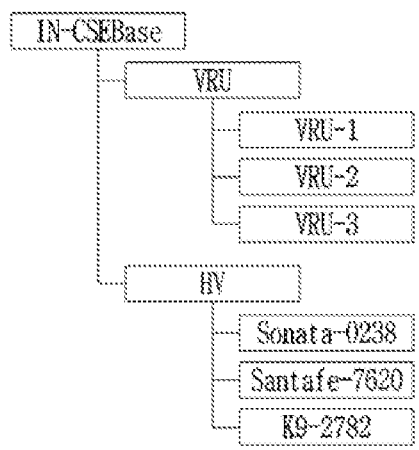
FIGS. 7A and 7B are views illustrating a resource offloading method according to the present disclosure.
Figure 7B:
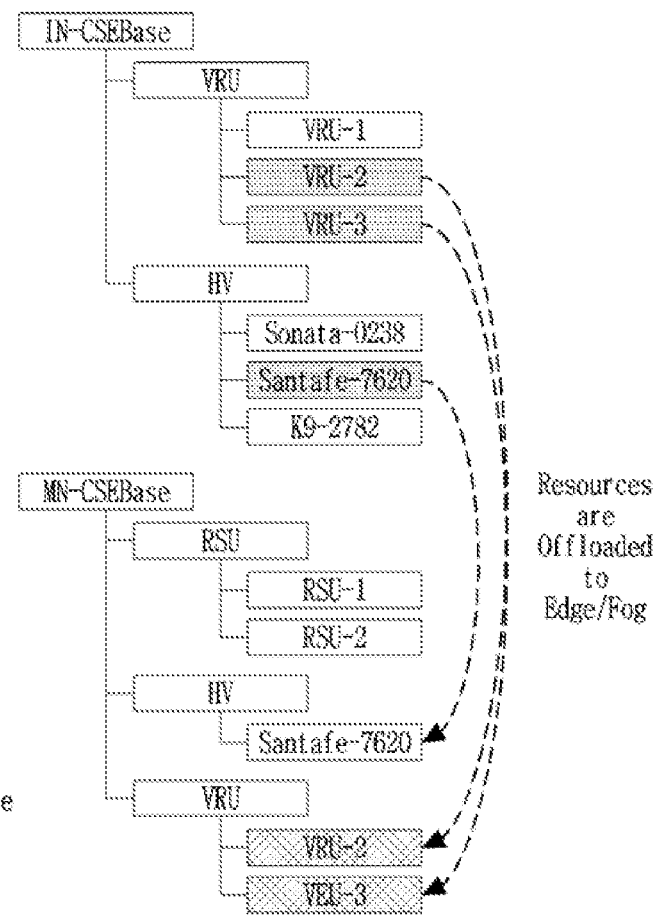
Figure 8:
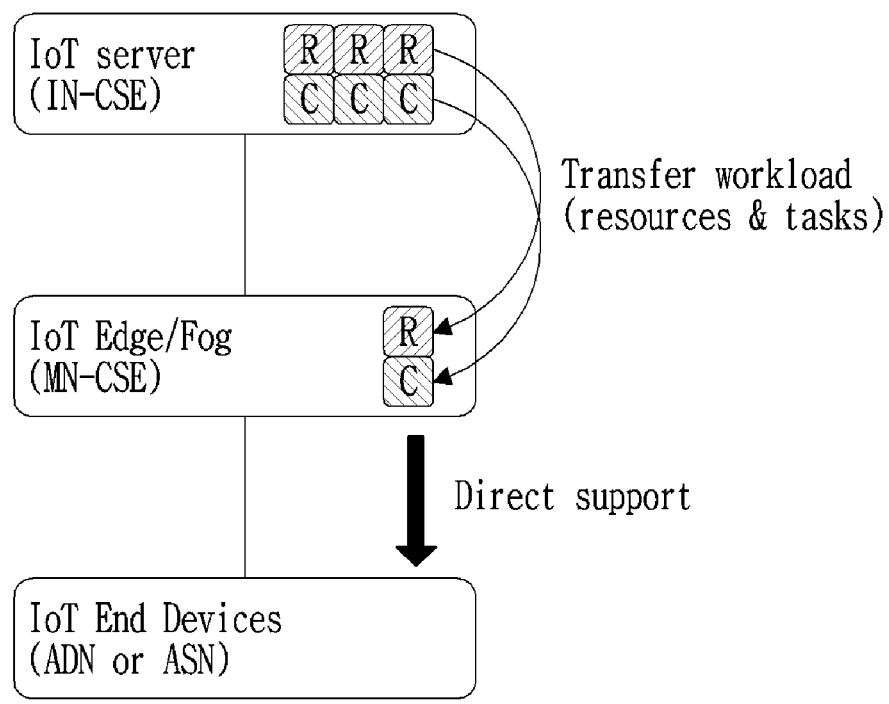
FIG. 8 is a view illustrating a resource offloading method according to the present disclosure.

FIG. 7 and FIG. 8 are views illustrating a method in which offloading is performed to an MN node. Referring to FIG. 7A, resources may be registered to an IN node and an MN node, respectively, before offloading is performed. For example, the IN node may correspond to a server, and the MN node may correspond to an edge/fog node, but the present disclosure is not limited thereto. Herein, as an example, an application for a user and an application for a vehicle may be registered as resources in the server (or IN node, H-CSE). In this case, information on each application may be included in each application resource and/or task as a sub-resource. In addition, as an example, a separate resource and/or task may also be included in the edge/fog node (or MN node, R-CSE). That is, a separate resource and/or task may be registered for the corresponding CSE as MN node. As an example, referring to FIG. 7B, a resource registered in a server may be offloaded to an edge/fog node. Herein, as described above, the resource offloading may be performed for a necessary resource and/or task based on a predetermined area or a predetermined condition. As an example, in FIG. 7B, for information on a user and a vehicle included in a predetermined area as described above, application resources for the user and the vehicle respectively may be offloaded to an MN node. Herein, in the MN node, information on the user and the vehicle included in the above-described area may be included in each application resource. Thus, the operation of each application for each user and each vehicle may be performed based on a resource of MN node, and the low-latency requirement may be satisfied.

In addition, as an example, referring to FIG. 8, a resource and/or a task included in a server (or IoT server, IN-CSE) as described above may be offloaded to implemented. an edge/fog (or IoT Edge/Fog, MN-CSE). Herein, as an example, a lower terminal (or IoT End Device, ADN, ASN) may be supported by operations related to a resource through a service before the resource is offloaded. On the other hand, after the resource is offloaded, the lower terminal may directly receive the resource-related operations through an edge/fog.

That is, as described above, in consideration of delay and reliability reduction by a centralized method, it is possible to offload related resources to an edge/fog node, and the present disclosure is not limited to the above-described embodiment.

Figure 9:
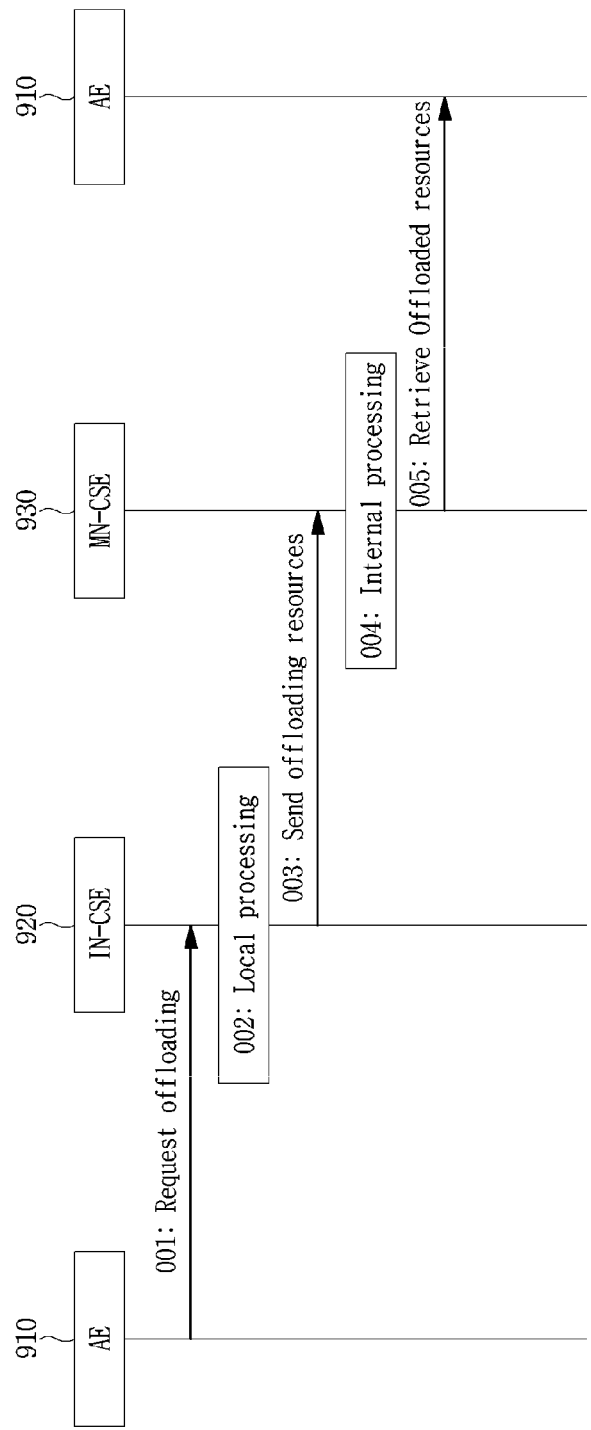
FIG. 9 is a view illustrating a method for requesting resource offloading according to the present disclosure.

Herein, as an example, the resource and/or task(hereinafter, referred to as resource for convenience of description, but may be resource and/or task) offloading may be triggered by a user. That is, the resource offloading may be triggered through an application. As an example, referring to FIG. 9, the application (AE) 910 may transmit a request message for resource offloading to the IN-CSE (or server) 920. Herein, the request message for resource offloading may include at least one of an offloading indication, a target offloading resource, an address of the destination CSE, and status information of an offloading resource. Herein, as an example, the target offloading resource, as a relevant service or a resource related to the service, may mean a resource that needs to be offloaded. As an example, the target offloading resource may be provided as a list of target resources. That is, information on resources that are to be offloaded may be included in a request message. In addition, the address of the destination CSE may be address information for an IN-CSE or an MN-CSE. As an example, a CSE to which a resource is offloaded may be an MN-CSE, as described above. However, as an example, a CSE to which a resource is offloaded may be an IN-CSE. As an example, when an IN-CSE is adjacent to a user (or AE) requesting a corresponding service and overhead is not great, a resource may be offloaded to the IN-CSE. That is, an IN-CSE may also become a target of resource offloading, but is not limited to the above-described embodiment. In addition, as an example, status information of an offloading resource may mean status information after the resource is offloaded. More specifically, while a resource is being offloaded to a target CSE, a source resource may be invisible. That is, a source resource may not be accessible to an offloaded resource. As an example, as described above, when a source resource is inaccessible, status information may be "Block". In addition, as an example, when a resource is offloaded, readable permission for a source resource may be allowed. That is, even when a corresponding resource is offloaded to another CSE, a source IN-CSE may be capable of reading and checking a source resource. Herein, as an example, the above-described status information may be "Readable". In addition, as an example, when a resource is offloaded, readable and writable permission for a source resource may be allowed. That is, even when a corresponding resource is offloaded to another CSE, a source IN-CSE may be capable of reading and even changing a source resource. Herein, as an example, the above-described status information may be "Writable". That is, a request message may include not only information on a target resource to be offloaded but also status information of an offloaded resource and is not limited to the above-described embodiment.

Meanwhile, the application (or user) 910 may transmit a request message for resource offloading to the IN-CSE (or server) 920. Next, the IN-CSE 920 may perform a configuring operation for resource offloading. Herein, as an example, the IN-CSE 920 may perform parameter configuration for offloading. Herein, as an example, when each offloading resource is configured (that is, parameter configuration is completed), offloading status may be activated. Otherwise, offloading status may be inactivated. Next, the IN-CSE 920 may push an offloaded resource to a destination MN-CSE 930. That is, the IN-CSE 920 may deliver an offloaded resource to the MN-CSE 930. Next, the MN-CSE 930 may generate the offloaded resource based on a request from the IN-CSE 920. Next, the AE 910 may retrieve the offloaded resource through the MN-CSE 930. That is, the AE 910 may directly receive a target resource through the MN-CSE 930, thereby reducing latency.

Figure 10:
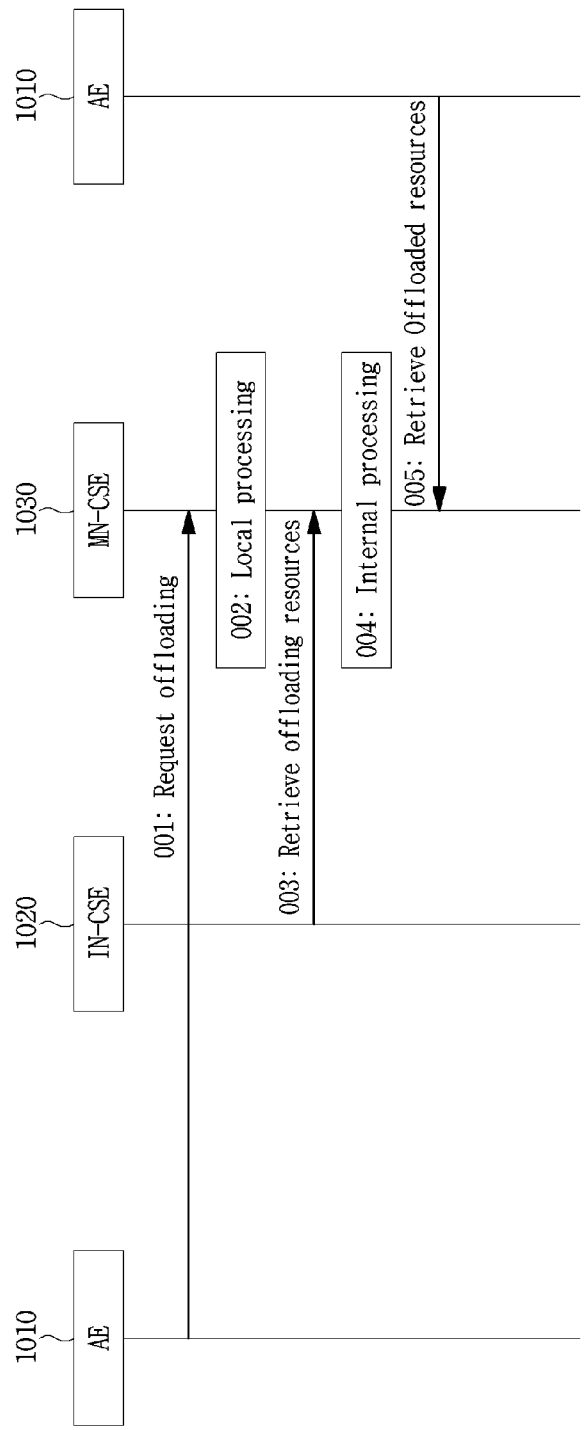
FIG. 10 is a view illustrating a method for requesting resource offloading according to the present disclosure.

As another example, referring to FIG. 10, an application (AE) 1010 may transmit a request message for resource offloading to an MN-CSE (or edge/fog node) 1030. That is, unlike in FIG. 9, the application 1010 may request resource offloading directly to the MN-CSE 1030. Herein, the request message for resource offloading may include at least one of an offloading indication, a target offloading resource, an address of the destination CSE, and status information of an offloading resource. Herein, as an example, the target offloading resource, as a relevant service or a resource related to the service, may mean a resource that needs to be offloaded. As an example, the target offloading resource may be provided as a list of target resources. That is, information on resources that are to be offloaded may be included in a request message. In addition, the address of the destination CSE may be address information for an IN-CSE or an MN-CSE. As an example, a CSE to which a resource is offloaded may be an MN-CSE, as described above. However, as an example, a CSE to which a resource is offloaded may be an IN-CSE. As an example, when an IN-CSE is adjacent to a user (or AE) requesting a corresponding service and overhead is not great, a resource may be offloaded to the IN-CSE. That is, an IN-CSE may also become a target of resource offloading, but is not limited to the above-described embodiment. In addition, as an example, status information of an offloading resource may mean status information after the resource is offloaded. More specifically, while a resource is being offloaded to a target CSE, a source resource may be invisible. That is, a source resource may not be accessible to an offloaded resource. As an example, as described above, when a source resource is inaccessible, status information may be "Block". In addition, as an example, when a resource is offloaded, readable permission for a source resource may be allowed. That is, even when a corresponding resource is offloaded to another CSE, a source IN-CSE may be capable of reading and checking a source resource. Herein, as an example, the above-described status information may be "Readable". In addition, as an example, when a resource is offloaded, readable and writable permission for a source resource may be allowed. That is, even when a corresponding resource is offloaded to another CSE, a source IN-CSE may be capable of reading and even changing a source resource. Herein, as an example, the above-described status information may be "Writable". That is, a request message may include not only information on a target resource to be offloaded but also status information of an offloaded resource and is not limited to the above-described embodiment.

Meanwhile, the application (or user) 1010 may transmit a request message for resource offloading to the IN-CSE (or server) 1030. Next, the MN-CSE 1030 may generate an offloading request message and transmit the message to the IN-CSE (or server) 1020. Herein, as an example, the offloading request message may include at least one of information on an offloading request and information on a target offloading resource. In addition, as an example, information included in a request message that is transmitted by the application 1010 to the MN-CSE 1030 may be further included in the above-described offloading request message. The present disclosure is not limited to the above-described embodiment. Next, the MN-CSE 1030 may retrieve the target offloaded resource from the IN-CSE 1020. Next, the MN-CSE 1030 may update the offloaded resource and generate the resource. Next, the AE 1010 may retrieve the offloaded resource through the MN-CSE 1030. That is, the AE 1010 may directly receive a target resource through the MN-CSE 1030, thereby reducing latency.

Figure 11:
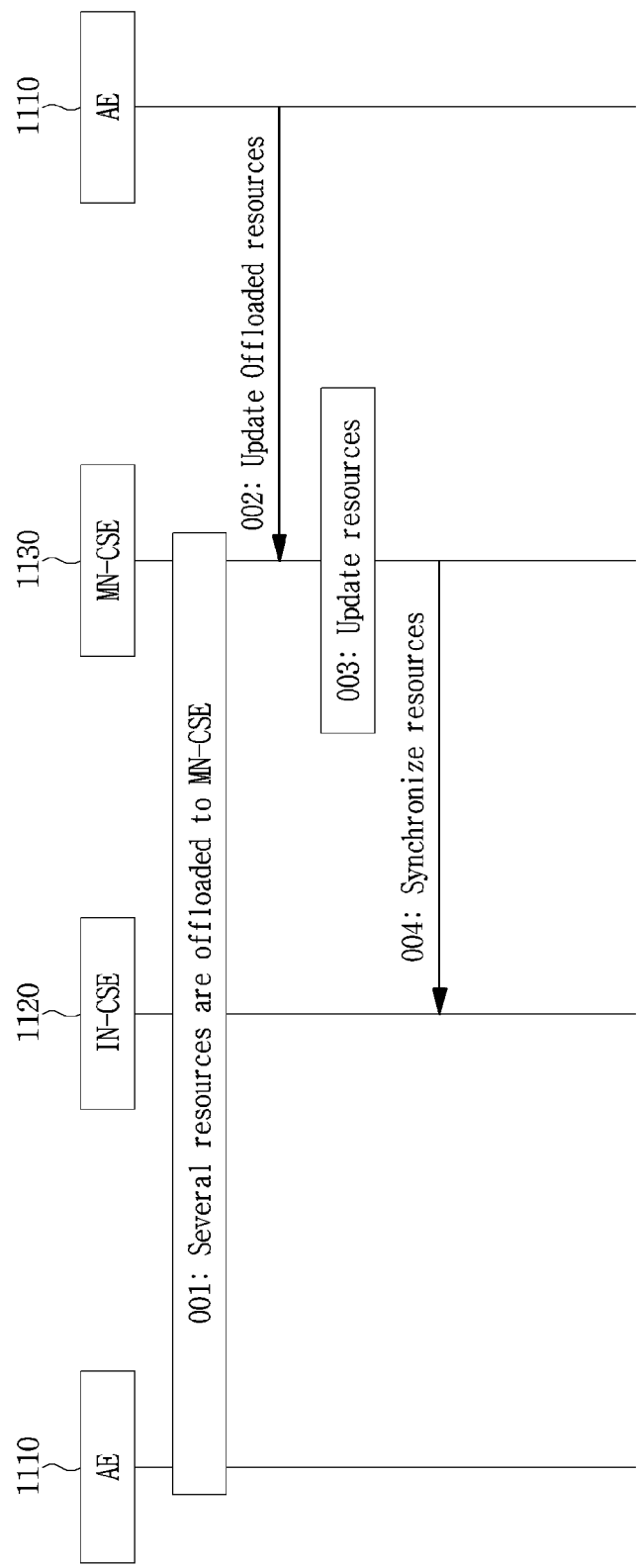
FIG. 11 is a view illustrating a method for updating resource offloading according to the present disclosure.

In addition, as an example, referring to FIG. 11, an offloaded resource may be updated. More specifically, based on FIG. 9 or FIG. 10 described above, a target resource may be offloaded to an MN-CSE. Herein, offloaded resources may be stored in the MN-CSE. Herein, as an example, referring to FIG. 11, the AE 1110 may update at least one or more offloaded resources. In addition, as an example, the AE 1110 may update at least one offloading set. That is, the AE 1110 may update an offloaded resource. Herein, as an example, the AE 1110 may transmit a request message for updating an offloaded resource to the MN-CSE 1130. Herein, the MN-CSE 1130 may update a value for an offloaded resource. In addition, the MN-CSE 1130 may transmit an updated offloading resource value to the IN-CSE 1120, thereby implementing synchronization. Herein, as an example, when the status information of a resource is the above-described "Block", the above-described update (or synchronization) may be suspended until every offloaded resource is released from the MN-CSE 1130. That is, as described above, since a source resource is not accessible to the IN-CSE 1120, the above-described update may be implemented only when all the offloaded resources are released from the MN-CSE 1130.

Figure 12:
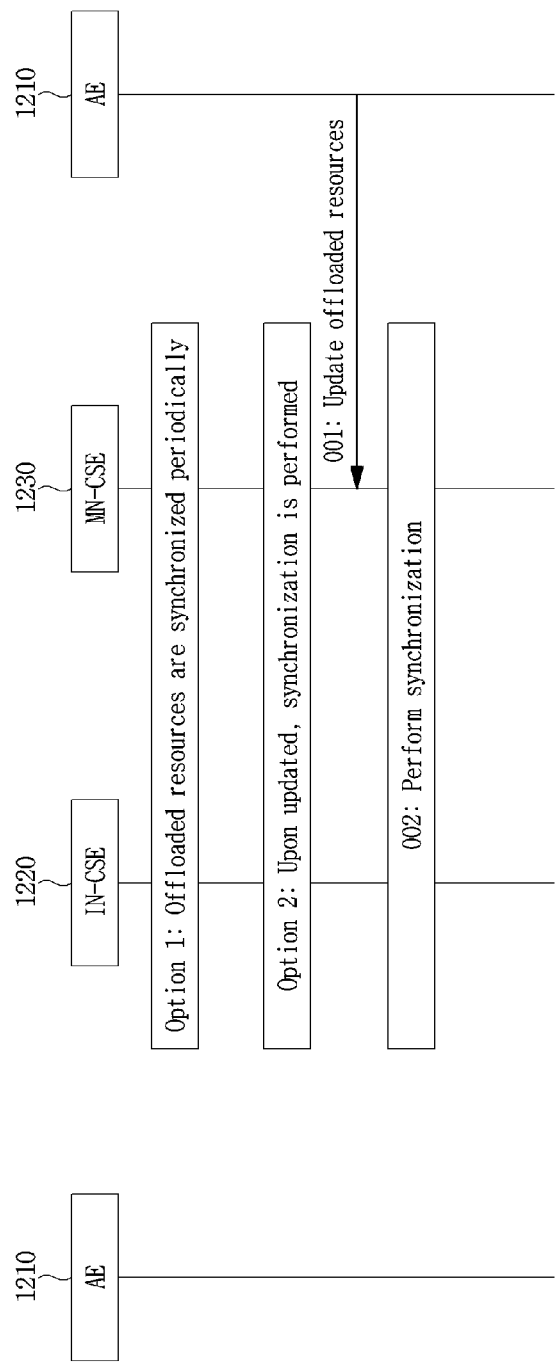
FIG. 12 is a view illustrating a method for updating resource offloading according to the present disclosure.

In addition, as an example, referring to FIG. 12, when a resource is offloaded to an MN-CSE 1230, an IN-CSE 1220 and the MN-CSE 1230 may periodically execute synchronization for the offloaded resource. Herein, as an example, the synchronization for the offloaded resource may be periodically performed based on a timer. More specifically, when a resource is offloaded from the IN-CSE 1220 to the MN-CSE 1230, a timer may start. Herein, when the timer ends, the IN-CSE 1220 and the MN-CSE 1230 may execute synchronization. In addition, after the synchronization is performed, the timer may start again. Next, when the timer ends, the IN-CSE 1220 and the MN-CSE 1230 may execute synchronization. That is, the IN-CSE 1220 and the MN-CSE 1230 may periodically execute synchronization.

As another example, the AE 1210 may update at least one or more offloaded resources. Herein, the IN-CSE 1220 and the MN-CSE 1230 may execute a synchronization process. That is, the MN-CSE 1230 may execute synchronization with IN-CSE 1220 based on an update operation of the AE 1210. That is, the MN-CSE 1230 may execute synchronization with the IN-CSE 1220 based on a triggered event.

In addition, as an example, when detecting an update operation of the AE 1210 while being periodically synchronized, as described above, the IN-CSE 1220 and the MN-CSE 1230 may execute synchronization. Herein, as an example, even when synchronization is executed by an update operation of the AE 1210, a timer may start again. That is, the IN-CSE 1220 and the MN-CSE 1230 may execute update for an event while periodically executing synchronization but is not limited to the above-described embodiment.

Figure 13:
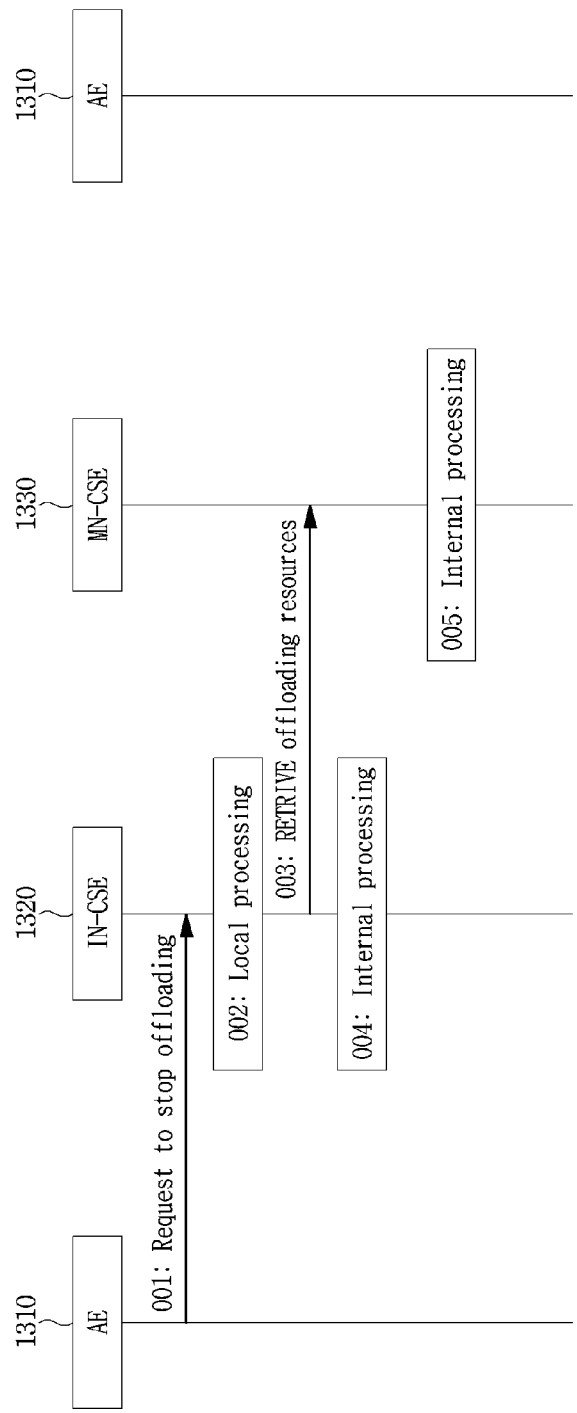
FIG. 13 is a view illustrating a method for suspending resource offloading according to the present disclosure.

As another example, referring to FIG. 13, an AE 1310 may transmit a request message for suspending offloading to an IN-CSE 1320. Herein, as an example, the request message may include at least one of information on a target resource and information on a command of offloading suspension. In addition, as an example, information on a target resource may include information on an MN-CSE 1330. That is, information on an offloaded resource and a destination CSE of resource offloading may also be included. Herein, when the IN-CSE 1320 receives the above-described request, the IN-CSE 1320 may obtain offloading resource information that is stored. Next, the IN-CSE 1320 may retrieve a value of the offloaded resource from the MN-CSE 1330 and update the value. Next, the MN-CSE 1330 may delete the offloaded resource. That is, an offloaded resource may be released from the MN-CSE 1330 and return to the IN-CSE 1320 that is a source resource.

Figure 14:
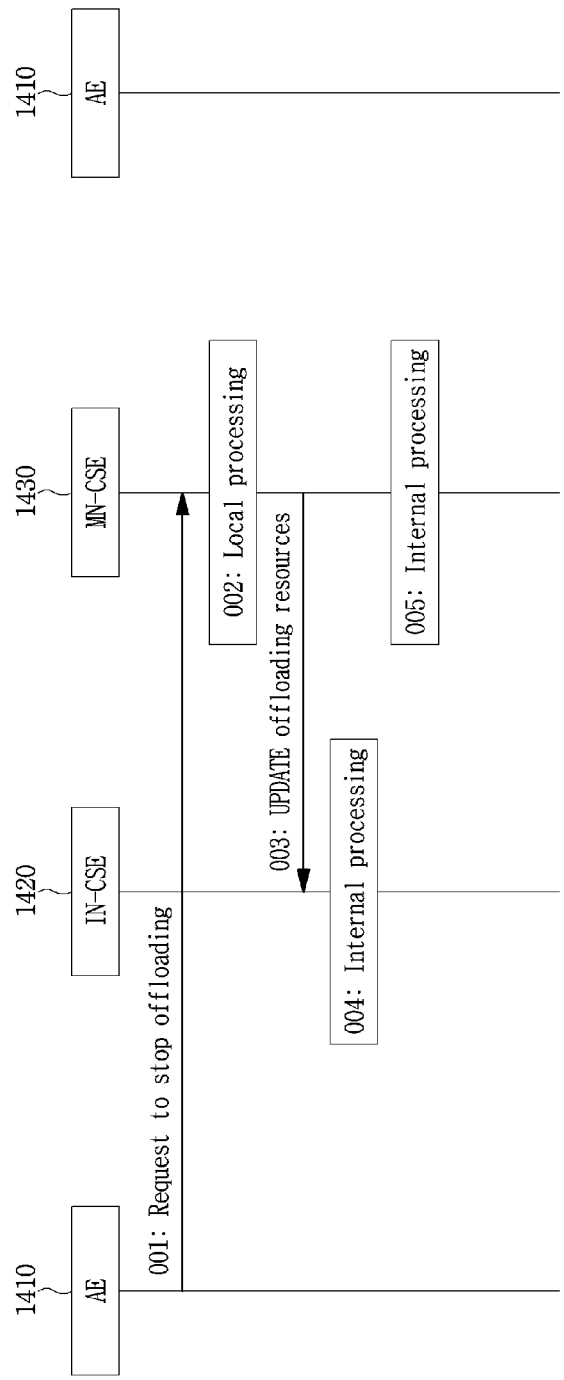
FIG. 14 is a view illustrating a method for suspending resource offloading according to the present disclosure.

As another example, referring to FIG. 14, an AE 1410 may transmit a request message for suspending offloading to an MN-CSE 1430. Herein, as an example, the request message may include at least one of information on a target resource and information on a command of offloading suspension. In addition, as an example, information on a target resource may include information on the MN-CSE 1430. That is, information on an offloaded resource and a destination CSE of resource offloading may also be included. Herein, when the MN-CSE 1430 receives the above-described request, the MN-CSE 1430 may obtain offloading resource information that is stored. Next, the MN-CSE 1430 may update the offloaded resource. Next, the IN-CSE 1420 may execute update by obtaining the above-described value from the MN-CSE 1430. Next, the MN-CSE 1430 may delete the offloaded resource.

That is, an offloaded resource may be released from the MN-CSE 1430 and return to the IN-CSE 1420 that is a source resource.

Figure 15:
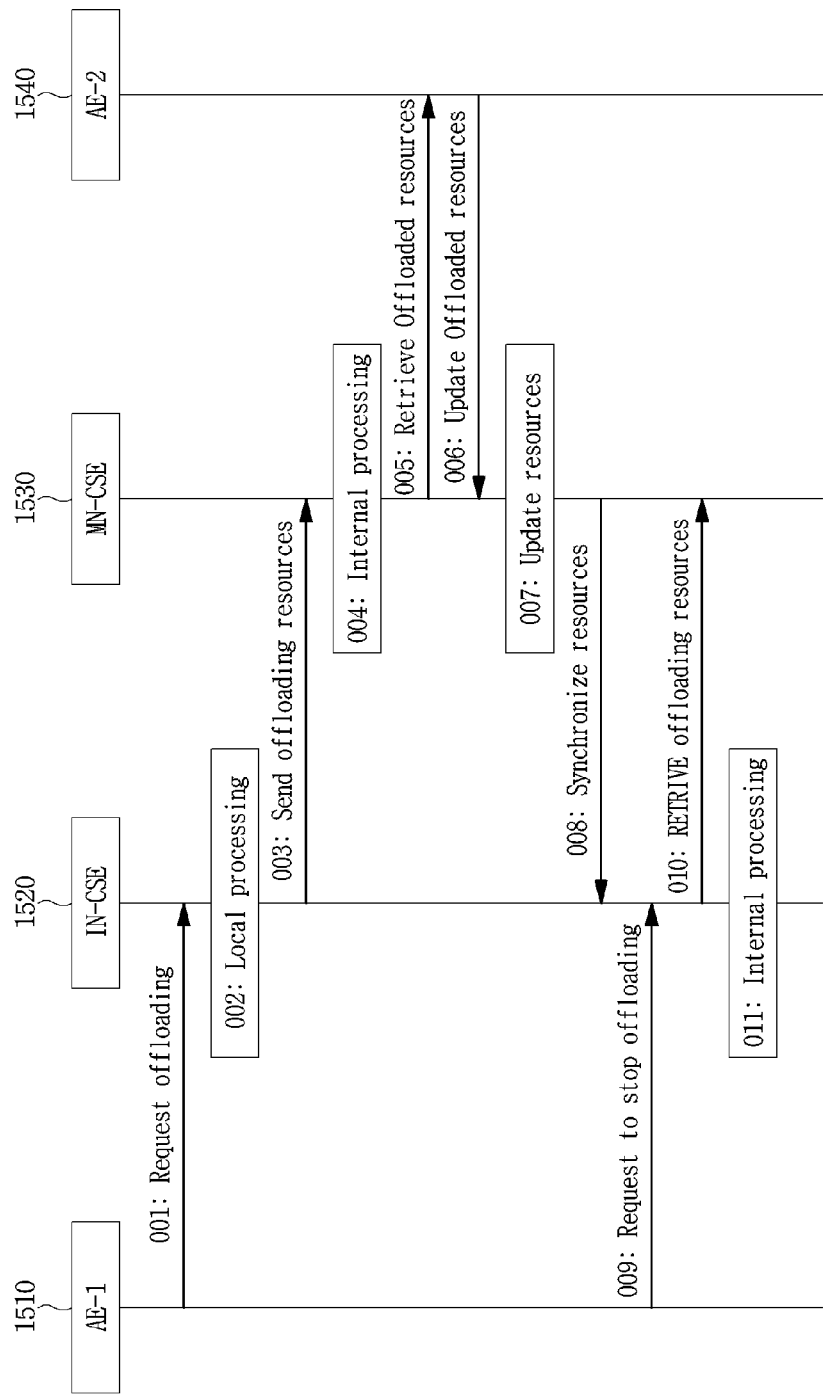
FIG. 15 is a view illustrating a method of performing resource offloading according to the present disclosure.

FIG. 15 is a view illustrating a method of performing resource offloading.

Referring to FIG. 15, an application entity node may execute an offloading process to receive a specific service from a closest edge/fog node. As an example, an AE1 1510 may transmit an offloading request message to an IN-CSE 1520. Herein, as an example, the offloading request message may include, as described above, at least one of an offloading indication, a target offloading resource, an address of the destination CSE, and status information of an offloading resource. Herein, as an example, the target offloading resource, as a relevant service or a resource related to the service, may mean a resource that needs to be offloaded. As an example, the target offloading resource may be provided as a list of target resources. That is, information on resources that are to be offloaded may be included in a request message. In addition, the address of the destination CSE may be address information for an IN-CSE or an MN-CSE. As an example, a CSE to which a resource is offloaded may be an MN-CSE, as described above. However, as an example, a CSE to which a resource is offloaded may be an IN-CSE. As an example, when an IN-CSE is adjacent to a user (or AE) requesting a corresponding service and overhead is not great, a resource may be offloaded to the IN-CSE. That is, an IN-CSE may also become a target of resource offloading, but is not limited to the above-described embodiment. In addition, as an example, status information of an offloading resource may mean status information after the resource is offloaded. More specifically, while a resource is being offloaded to a target CSE, a source resource may be invisible. That is, a source resource may not be accessible to an offloaded resource. As an example, as described above, when a source resource is inaccessible, status information may be "Block". In addition, as an example, when a resource is offloaded, readable permission for a source resource may be allowed. That is, even when a corresponding resource is offloaded to another CSE, a source IN-CSE may be capable of reading and checking a source resource. Herein, as an example, the above-described status information may be "Readable". In addition, as an example, when a resource is offloaded, readable and writable permission for a source resource may be allowed. That is, even when a corresponding resource is offloaded to another CSE, a source IN-CSE may be capable of reading and even changing a source resource. Herein, as an example, the above-described status information may be "Writable". That is, a request message may include not only information on a target resource to be offloaded but also status information of an offloaded resource and is not limited to the above-described embodiment.

In addition, as an example, there is no application logic operating for a corresponding service in a target edge/fog node, an algorithm, service logic or an AE for the service may be delivered to the target edge/fog node. As an example, the AE 1510 may transmit a request message for offloading for a plurality of resources or group resources, which is the same as described above.

Next, the IN-CSE may configure an offloading resource. Herein, each resource that is offloaded may be marked through further information in order to indicate that it is an offloaded resource. Herein, as an example, marking may be performed based on address information of an edge/fog node. Each resource that is offloaded in the IN-CSE 1520 may be marked based on whether or not it is offloaded and information on a node to which it is offloaded, but is not limited to the above-described embodiment.

Next, the IN-CSE 1520 may register an offloaded resource to a destination MN-CSE (edge/fog node) 1530. That is, the IN-CSE 1520 may push information on an offloaded resource to the MN-CSE 1530. Next, the MN-CSE 1530 may generate the offloaded resource based on a request from the IN-CSE 1520. Next, an AE2 1540 may retrieve information on a corresponding service based on the resource that is offloaded to the MN-CSE 1530. As an example, the corresponding service in the above description may be a VRU detection service and provide a VRU detection and warning service.

In addition, the AE2 1540 may update at least one offloaded resource. In addition, as an example, the AE2 1540 may update some sets of offloaded resources but is not limited to the above-embodiment. Herein, as an example, in the case of a VRU detection service as described above, the update may be performed when a VRU moves to an application zone (or service zone), but is not limited to the above-described embodiment. In addition, as an example, the MN-CSE 1530 may receive update information from the AE2 1540. Next, the MN-CSE 1530 may also execute update based on an offloaded resource. In addition, when the MN-CSE 1530 executes update as described above, the MN-CSE 1530 may transmit updated information to the IN-CSE 1520. Herein, as an example, the IN-CSE 1520 and the MN-CSE 1530 may execute synchronization based on the above-described information. Herein, as described above, when the status information of a resource is "Block", the above-described update (or synchronization) may be suspended until every offloaded resource is released from the MN-CSE 1530. That is, as described above, since a source resource is not accessible to the IN-CSE 1520, the above-described update may be implemented only when all the offloaded resources are released from the MN-CSE 1530.

In addition, as an example, when resource processing in an edge/fog node is not needed for a corresponding service, offloaded may be suspended. As an example, the AE1 1510 may transmit a request message for suspending offloading to the IN-CSE 1520. Herein, the request message for suspending offloading may include at least one of information indicating the offloading suspension for a target resource and information indicating suspension for a service related to an offloading resource. In addition, as an example, information on a target resource may include information on the MN-CSE 1530. That is, information on an offloaded resource and a destination CSE of resource offloading may also be included. Herein, when the IN-CSE 1520 receives the above-described request, the IN-CSE 1520 may obtain offloading resource information that is stored. Next, the IN-CSE 1520 may retrieve a value of an offloaded resource from the MN-CSE 1530 and update it. Next, the MN-CSE 1530 may delete the offloaded resource. That is, an offloaded resource may be released from the MN-CSE 1530 and return to the IN-CSE 1520 that is a source resource.

In addition, as an example, resource announcement may be supported in relation to offloading described above. More specifically, resource announcement may mean a process of generating a resource (i.e., original resource), which a specific CSE has, as an announced resource type in another CSE. Thus, a remote CSE may know the existence of an original resource, have access to the original resource and use a service. Herein, when obtaining a resource for a specific service, a remote CSE does not retrieve many CSEs but may easily check a desired resource through an announced resource. However, resource announcement does not include every information for an original resource within a CSE but may provide only limited information. As an example, an announced resource may include only limited information on attribute and limited information on child resource.

Herein, as an example, for edge/fog offloading, an additional attribute may be defined in the announced resource that is described above. More specifically, a CSE may push an original resource to a remote CSE based on resource announcement. However, the CSE may push not every information but only necessary information on the original resource to the remote CSE. However, in the case of edge/fog offloading, as described above, considering latency for a corresponding service, a terminal (or a device or an AE) may request that a resource be offloaded to a closest gateway (or a server or a CSE). Accordingly, when a resource is offloaded, every information on an original resource needs to be provided to a remote CSE (or gateway). Herein, the original resource and the offloaded resource may be in a relation of implementing a synchronization mechanism, as described above, and may update information based on that. In addition, as an example, an operation based on an additional resource, which is designated for offloading, may be implemented between an original resource and an offloaded resource, but is not limited to the above-described embodiment.

Herein, as an example, the above-described edge/fog offloading may be supported based on resource announcement. More specifically, a resource set (or at least any one resource) may be offloaded to a remote CSE. Herein, as an example, attribute information for offloading may be defined based on resource announcement. Herein, as an example, the above-described resource announcement type may push every necessary information for offloading to a remote CSE, as described above. In addition, as an example, information on every attribute and information on every child for an announced resource may be provided to a remote CSE. Thus, the remote CSE may support the same function and operation as the original CSE. In addition, as an example, an announced resource may be coupled with an original resource through a link to an original CSE. Herein, the original resource may also be coupled with the announced resource and share information on a synchronization type. As an example, when an original resource is announced to a remote CSE based on offloading, the remote CSE needs to process every request for the original resource for an edge/fog service. Accordingly, every movement and operation for an original resource needs to be synchronized with an offloaded resource (or announced resource). Herein, as an example, synchronization may be periodically executed, as described above. As an example, as described above, in the case of periodical synchronization, it may be executed based on timer. In addition, as an example, when update (or modification) occurs, synchronization may be instantly executed. That is, synchronization may be executed based on a triggering type, as described above. As another example, an original resource may be updated only when an announced resource is deleted from a remote CSE and thus an edge/fog service terminates. As an example, a case may be considered in which, while an application receives an edge/fog service through an announced resource, the announced resource moves to another edge/fog node (i.e., another remote CSE). Herein, every announced resource may be pushed from an existing remote CSE to a new remote CSE. Herein, the connection of an original CSE to an original resource may be updated to a new remote CSE. That is, when a remote CSE for offloading is deleted and pushed to a new remote CSE, an original resource may be updated.

That is, resource announcement may be used to notify the existence of an existing resource, which a specific CSE has, to enable access to an original resource and to use a service. Herein, in the above-described case, information on some attributes and information on some child resources may be pushed to a remote CSE. However, in consideration of the above-described offloading, resource announcement may push every information on an original resource, and a remote CSE may be supported through an additional attribute so that the remote CSE may execute every movement and operation of the original resource. Herein, as an example, Table 1 below may be attribute information for edge/fog offloading based on the above-description, but is not limited to the above-described embodiment. As a specific example, in Table 1 below, information on "announceTo" and "announcedAttribute" may be defined by considering resource announcement. "announceTo" and "announcedAttribute" may be the same as information on an existing announcement attribute.

Herein, as an example, attribute information for "announceType" may be defined. Herein, "announceType" may indicate whether it is an existing announcement or whether it is an announcement for offloading. That is, an existing announcement operation and an announcement for offloading may be distinguished through "announceType". As an example, when "announceType" is "Announcement", an original resource may be announced to a remote CSE based on an existing resource announcement. In addition, as an example, when "announceType" is "Offload", an original resource may be offloaded to a remote CSE based on offloading, as described above. In addition, as an example, "synchmode" attribute information may be defined. "synchmode" may be attribute information that may exist only when "announceType" indicates offloading. Herein, "synchmode" may be a mode in which synchronization with an original resource is executed. As an example, synchronization may be periodically executed, as described above. Herein, "synchmode" may be set to "Periodic". That is, when "synchmode" is "Periodic", an announced (or offloaded) resource and an original resource may be synchronized based on a predetermined interval. As an example, the predetermined interval may be set based on the above-described timer, but is not limited to the above-described embodiment.

In addition, synchronization may be executed when update is executed for an announced (or offloaded) resource. Herein, "synchmode" may be set to "Update". That is, when "synchmode" is "Update", an announced (or offloaded) resource and an original resource may be synchronized when update for the announced (or offloaded) resource is executed. Herein, as an example, the synchronization may be executed based on event triggering and is not limited to the above-described embodiment.

In addition, as an example, synchronization may be executed only when announcement finishes. Herein, "synchmode" may be set to "Finish". That is, when "synchmode" is "Finish", an announced (or offloaded) resource and an original resource may be synchronized when announcement (or offloading) finishes. Herein, as an example, when announcement (or offloading) finishes as described above, synchronization may be executed to provide relevant information, but is not limited to the above-described embodiment.

That is, "synchmode" may indicate, among the above-described three modes, a mode in which synchronization is executed, and is not limited to the above-described embodiment.

In addition, as an example, attribute information for "postanncAccessMode" may be defined. Herein, "postanncAccessMode" may provide information on access policy for an original resource. Herein, as an example, "postanncAccessMode" may be attribute information that may exist only when "announceType" described above indicates offloading. Herein, "postanncAccessMode" may be indicated as "Block" or "Readable". As an example, when a resource is offloaded, every information on an original resource may be provided to a remote CSE. Accordingly, the remote CSE may process every request for a corresponding resource (or target resource). Herein, as an example, when "postanncAccessMode" is "Block", every operation in an original resource may be limited until resource announcement (or resource offloading) finishes. Herein, every request for an original resource may be pushed to an offloaded resource and thus every resource may be processed in an edge/fog node. As an example, since a remote CSE may know every information on an announced (or offloaded) resource, as described above, and process every operation, when a resource is announced (or offloaded) to the remote CSE, access to an original resource may be limited as described above.

In addition, as an example, when "postanncAccessMode" is "Readable", only retrieve operation may be allowed to an original resource. That is, retrieve operation for an original resource may be possible. As an example, as described above, since a remote CSE may know every information on an announced (or offloaded) resource and process every operation, writable permission may not be given so that an original resource is not modified or updated. Thus, a service may be smoothly provided in an edge/fog node, as described above.

TABLE 1

| Attribute Name | Description |
| --- | --- |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26.<br>For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(s) for announcement purposes. It is the responsibility of the Hosting-CSE referenced by the resource address(s) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| announceType | This attributes indicate the type of resource announcement. Possible values are as follows:<br>Announcement: This is the original announcement type<br>Offload: This is an announcement type for resource offloading |
| synchMode | This attributes provide information about synchronization mechanisms between the original resource and the announced resource. This attribute shall only be presented when the announceType attributed is indicated as 'Offload'.<br>Periodic: Synchronization is performed periodically<br>Update: Synchronization is performed whenever an update to announcedResource is performed<br>Finish: Synchronization is performed when an announcement is finished |
| postanncAccessMode | This attributes provide information about access policy to the original resource. This attribute shall only be presented when the announceType attributed is indicated as 'Offload'.<br>Block: As all the resources are copied and oerpated at the announced resource, all the operations to the original resource are blocked until the announcement is finished. All the requests to the original resource are forwarded to the offloaded resource.<br>Readable: Only the RETRIEVE operation is allowed to the original resource. |

In the present invention, the above-described AE, IN-CSE and MN-CSE may be respective nodes. Herein, the respective nodes may be included in each device. As an example, a device including an AE, a device including an IN-CSE and a device including an MN-CSE may operate as described above. As another example, the above-described nodes may be implemented in a single device. As an example, a device including an AE and an IN-CSE and a device including an AE and an MN-CSE may be implemented and operate as described above. Although the above description is based on AE, IN-CSE and MN-CSE as respective nodes, they may operate based on each device configuration and are not limited to the above-described embodiment.

Figure 16:
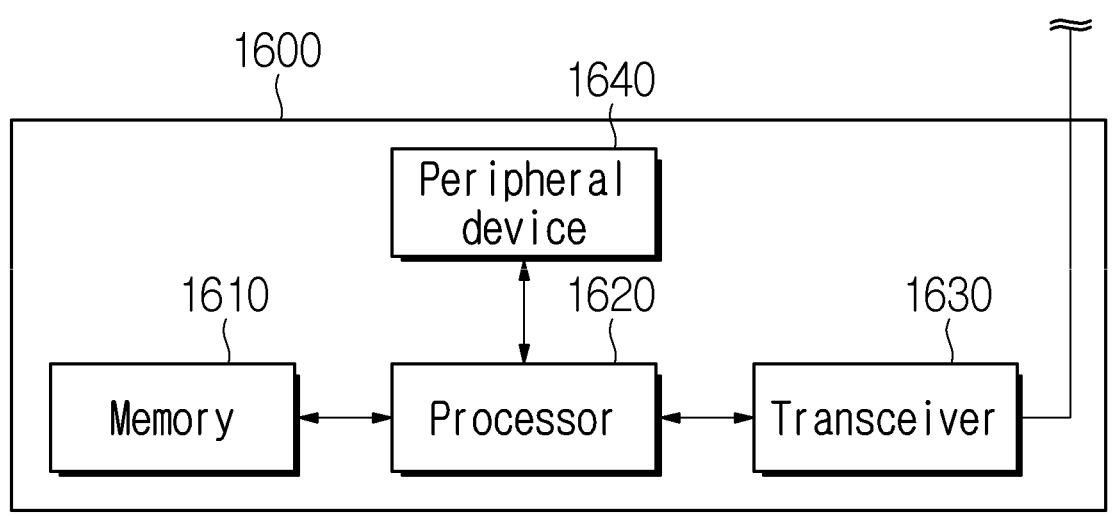
FIG. 16 is a view illustrating an apparatus configuration according to the present disclosure.

FIG. 16 is a view illustrating an apparatus configuration of the present invention.

Referring to FIG. 16, a device 1600 may include a memory 1610, a processor 1620, a transceiver 1630 and a peripheral apparatus 1640. In addition, for example, the device 1600 may further include another configuration and is not limited to the above-described embodiment. Herein, as an example, the device may be an apparatus operating based on the above-described M2M system. More specifically, the device 1600 of FIG. 16 may be an illustrative hardware/software architecture of an M2M network node such as an M2M device, an M2M gateway and an M2M server. Herein, as an example, the memory 1610 may be a non-removable memory or a removable memory. In addition, as an example, the peripheral apparatus 1640 may include a display, GPS or other peripherals and is not limited to the above-described embodiment. In addition, as an example, the above-described device 1600 may be a node. Herein, like the transceiver 1630, the node may include a communication circuit. Based on this, the node may perform communication with an external device.

In addition, as an example, the processor 1620 may be at least one of a general-purpose processor, a digital signal processor (DSP), a DSP core controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. Herein, the processor 1620 may execute computer-executable commands stored in the memory 1610 in order to implement various necessary functions of node. As an example, the processor 1620 may control at least any one operation among signal coding, data processing, power controlling, input and output processing, and communication operation. In addition, the processor 1620 may control a physical layer, an MAC layer and an application layer. In addition, as an example, the processor 1620 may execute an authentication and security process in an access layer and/or an application layer but is not limited to the above-described embodiment.

In addition, as an example, the processor 1620 may perform communication with other devices through the transceiver 1630. As an example, the processor 1620 may execute computer-executable commands so that a node may be controlled to perform communication with other nodes via a network. That is, communication performed in the present invention may be controlled. As an example, other nodes may be an M2M gateway, an M2M server and other devices. For example, the transceiver 1630 may send a RF signal through an antenna. It may send a signal based on various communication networks. In addition, as an example, MIMO technology and beam forming technology may be applied as antenna technology but are not limited to the above-described embodiment. In addition, a signal transmitted and received through the transceiver 1630 may be controlled by the processor 1620 by being modulated and demodulated, which is not limited to the above-described embodiment.

Figure 17:
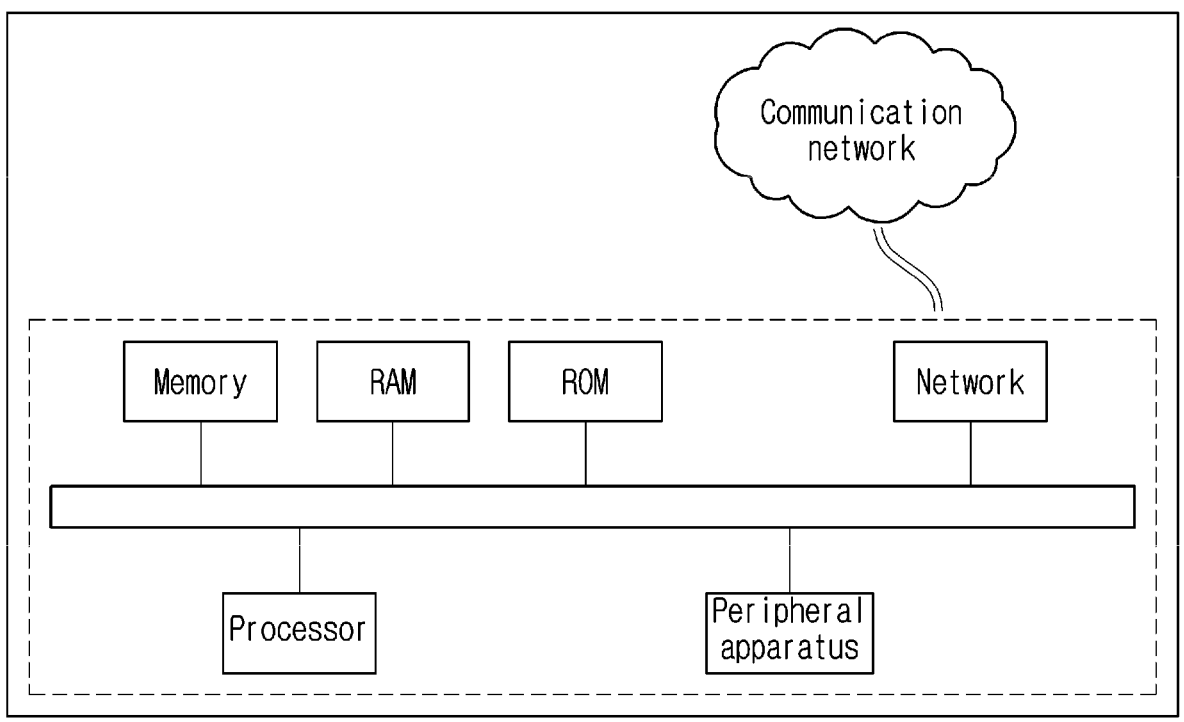
FIG. 17 is a view illustrating an apparatus configuration according to the present disclosure.

FIG. 17 may be an apparatus configuration for a device. Referring to FIG. 17, as described above, it may be controlled by a processor. Herein, as an example, a memory, RAM, ROM and a network may be included. In addition, another movable memory may be further included and is not limited to the above-described embodiment. Herein, the processor may be controlled to execute a command based on information stored in the above-described memories and to perform the operations described in the present invention. In addition, the processor may be provided with power by a power supply and be offered input information by peripherals, which is not limited to the above-described embodiment. In addition, as an example, a device may obtain location information and related information based on GPS and the like. In addition, as an example, a device may receive input information based on other input devices and is not limited to the above-described embodiment.

The above-described exemplary embodiments of the present invention may be implemented by various means. For example, the embodiments of the present invention may be implemented by hardware, firmware, software, or a combination thereof.

The foregoing description of the preferred embodiments of the present invention has been presented for those skilled in the art to implement and perform the invention. While the foregoing description has been presented with reference to the preferred embodiments of the present invention, it will be apparent to those skilled in the art that various modifications and variations can be made in the present invention without departing from the spirit or scope of the present invention as defined by the following claims. Accordingly, the present invention is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the invention and the method invention are explained, and the description of both inventions may be supplemented as necessary.

In addition, the present invention has been described with reference to preferred embodiments thereof. It will be understood by those skilled in the art that various changes in form and details may be made therein without departing from the essential characteristics of the present invention. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

What is claimed is:

1. A resource offloading method implemented in an apparatus, the method comprising:
   transmitting, by the apparatus, a request message indicating offloading for a target resource; and
   receiving, by the apparatus, a service through the target resource that is offloaded to a first node based on the request message;
   wherein the request message comprises information on the target resource; and
   wherein the target resource is offloaded from a second node to the first node based on the request message.

2. The resource offloading method of claim 1,
   wherein the second node comprises an original resource for the target resource, and
   wherein the first node comprises an offloaded resource for the target resource.

3. The resource offloading method of claim 2,
   wherein the offloaded resource comprised in the first node is managed based on a management policy.

4. The resource offloading method of claim 3,
   wherein the management policy comprises a blocking policy, and
   wherein, when the offloaded resource comprised in the first node is managed based on the blocking policy, access to the offloaded resource comprised in the first node is blocked.

5. The resource offloading method of claim 4,
   wherein, when the access to the offloaded resource comprised in the first node is blocked, an operation related to the original resource comprised in the second node is limited.

6. The resource offloading method of claim 3,
   wherein the management policy comprises a readable policy, and
   wherein, when the offloaded resource comprised in the first node is managed based on the readable policy, only retrieve operation is allowed among operations related to the original resource comprised in the second node.

7. The resource offloading method of claim 1,
   wherein the first node and the second node perform synchronization for the target resource, and
   wherein the request message indicating the offloading comprises information on a synchronization mode (synchmode) for the performed synchronization.

8. The resource offloading method of claim 7,
   wherein the synchronization mode comprises at least any one of a periodic mode, an update mode, and a termination mode.

9. The resource offloading method of claim 8,
   wherein, when the synchronization mode is the periodic mode, the first node and the second node periodically perform the synchronization for the target resource.

10. The resource offloading method of claim 8,
wherein, when the synchronization mode is the update mode, when an update is performed for the offloaded resource comprised in the first node, the first node and the second node perform the synchronization for the target resource.

11. The resource offloading method of claim 8,
wherein, when the synchronization mode is the termination mode, when the offloading for the target resource terminates, the first node and the second node perform the synchronization for the target resource.

12. The resource offloading method of claim 1,
wherein the first node is a middle node-common service entity (MN-CSE), and the second node is an infrastructure node-common service entity (IN-CSE).

13. An apparatus comprising:
at least one processor; and
at least one memory coupled to the at least one processor;
wherein the at least one processor, which is operably coupled to the at least one memory and executes program instructions stored in the at least one memory, transmits a request message indicating offloading for a target resource and receives a service through the target resource that is offloaded to a first node based on the request message;
wherein the request message comprises information on the target resource that is offloaded; and
wherein the target resource is offloaded from a second node to the first node based on the request message.

14. The apparatus of claim 13,
wherein the second node comprises an original resource for the target resource, and
wherein the first node comprises an offloaded resource for the target resource.

15. The apparatus of claim 14,
wherein the offloaded resource comprised in the first node is managed based on a management policy.

16. The apparatus of claim 15,
wherein the management policy comprises a blocking policy, and
wherein, when the offloaded resource comprised in the first node is managed based on the blocking policy, access to the offloaded resource comprised in the first node is blocked.

17. The apparatus of claim 16,
wherein, when the access to the offloaded resource comprised in the first node is blocked, an operation related to the original resource comprised in the second node is limited.

18. The apparatus of claim 15,
wherein the management policy comprises a readable policy, and
wherein, when the offloaded resource comprised in the first node is managed based on the readable policy, only retrieve operation is allowed among operations related to the original resource comprised in the second node.

19. The apparatus of claim 13,
wherein the first node and the second node perform synchronization for the target resource, and
wherein the request message indicating the offloading comprises information on a synchronization mode (synchmode) for the performed synchronization.

20. A resource offloading method implemented in a first node, the method comprising:
receiving, by the first node, a request message indicating offloading for a target resource from a second node; and
offloading, by the first node, the target resource to a third node based on the request message;
wherein the second node receives a service from the third node based on the target resource of the first node that is offloaded to the third node; and
wherein the request message comprises information on the target resource.

* * * * *